United States Patent [19]

Hawkes

[11] Patent Number: 4,614,583
[45] Date of Patent: Sep. 30, 1986

[54] HORIZONTAL BELT FILTER WITH INCREMENTAL BELT ADVANCE

[76] Inventor: Ralph O. Hawkes, 4482 Zarahemla Dr., Salt Lake City, Utah 84124

[21] Appl. No.: 712,627

[22] Filed: Mar. 18, 1985

[51] Int. Cl.⁴ ............................................. B01D 33/04
[52] U.S. Cl. ...................................................... 210/400
[58] Field of Search ............... 210/400, 401, 386, 350, 210/351, 138, 142, 143, 324, 359; 198/859, 812

[56] References Cited

U.S. PATENT DOCUMENTS

| | | | |
|---|---|---|---|
| 3,760,945 | 9/1973 | Davis | 210/400 |
| 3,870,641 | 3/1975 | Pierson | 210/400 |
| 4,127,487 | 11/1978 | Havalda | 210/401 |
| 4,153,550 | 5/1979 | Lautrette | 210/401 |
| 4,377,480 | 3/1983 | Pierson | 210/400 |
| 4,430,231 | 2/1984 | Bratten | 210/386 |
| 4,446,023 | 5/1984 | Pierson | 210/400 |
| 4,472,279 | 9/1984 | Pierson | 210/386 |
| 4,477,358 | 10/1984 | Heintges et al. | 210/401 |
| 4,483,770 | 11/1984 | Casey et al. | 210/416.1 |

FOREIGN PATENT DOCUMENTS

| | | | |
|---|---|---|---|
| 0232955 | 11/1959 | Australia | 210/400 |
| 3222235 | 12/1983 | Fed. Rep. of Germany | 210/400 |
| 0020602 | 2/1980 | Japan | 210/386 |
| 2030465 | 4/1980 | United Kingdom | 210/400 |
| 2090764 | 7/1982 | United Kingdom | 210/400 |
| 2092906 | 8/1982 | United Kingdom | 210/400 |
| 190254 | 1/1967 | U.S.S.R. | 198/859 |

OTHER PUBLICATIONS

Bulletin HuVac, Filterrange, Hubert Sneek ESMIL No publication date given. Consists of Cover and several pages with handwritten numbers 1-7 thereon. Believed published in mid 1981. Text, photos and sketch on page 2 are most pertinent.
Johnson-Progress ADPEC Horizontal Vacuum Belt Filter consisting of cover and two pages. Date of pubication not known.

Primary Examiner—Richard V. Fisher
Assistant Examiner—Linda S. Evans
Attorney, Agent, or Firm—Robert R. Finch

[57] ABSTRACT

A horizontal belt filter with incremental belt advance in which an endless belt is trained about a plurality of idler rollers to pass through an upper run which includes a filter section and a lower return run. The belt passes over only idler rollers. To index the belt for incremental advance through the filter section, a pair of idler rollers on a common shiftable frame are rapidly simultaneously shifted while the belt in the return run is braked against movement. The braking is accomplished by a pinch bar that presses against an idler roller with the belt between the bar and roller. After shifting, the belt is reset by slow retraction of the shiftable frame. All shifting of the frame is done by hydraulic rams. To assist in incremental belt advance, an air cushion may be introduced under the belt in the filter section. For feed distribution, and stage separation, inflatable dams are provided above the belt in the filtering section.

4 Claims, 13 Drawing Figures

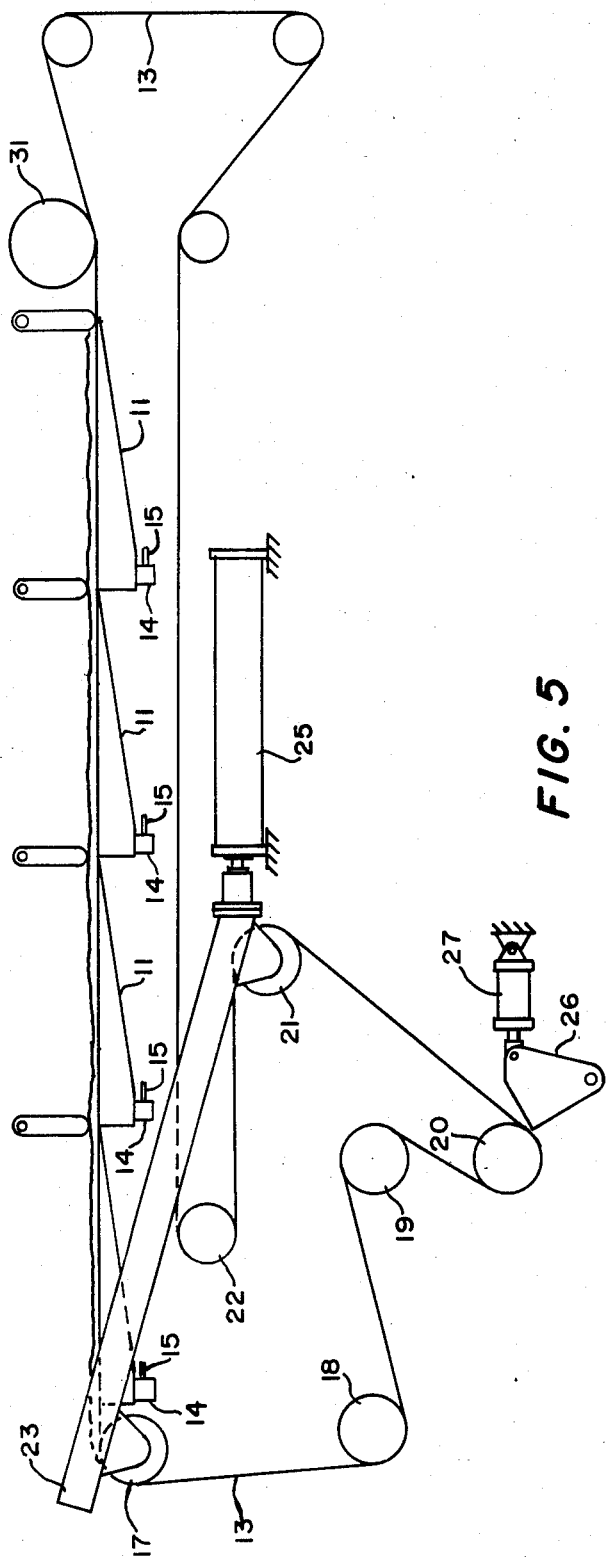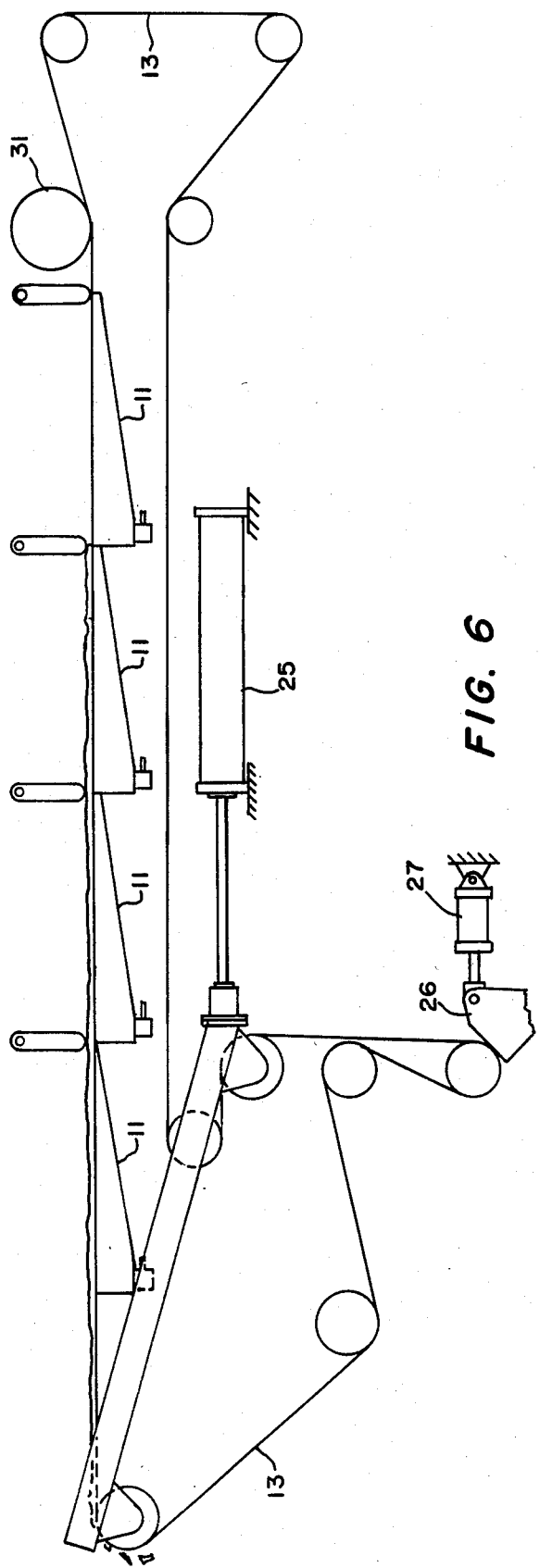
FIG. 5
FIG. 6

HORIZONTAL BELT FILTER WITH INCREMENTAL BELT ADVANCE

FIELD AND BACKGROUND OF THE INVENTION

This invention relates generally to separation of solids from liquids by filtration and in particular to horizontal belt filters in which an endless belt of filter medium is moved intermittently over one or more physically fixed vacuum filtration sections thence to cake discharge and return to filtration.

The type of horizontal belt filter with which this invention is concerned employs a series of fixed vacuum pans over which only the filter medium moves intermittently. One such filter is disclosed in U.S. Pat. No. 3,870,641 in which an endless belt filter medium is moved intermittently (indexed) over the vacuum pans with all movement of the filter medium being effected by a combination that includes one or more continuously rotating drive rollers in contact with the belt and at least two separate, but coordinated shiftable rollers. Vacuum is applied to the belt for preset filtration cycles but released for indexing of the belt.

Prior designs of this type filter have been quite successful and are in wide use, but they suffer from the disadvantage of excessive belt wear, stretching and power consumption on account of the continuously driven rollers and indexing systems employed. Also, the use of separate shiftable rollers for indexing requires a complex control system to coordinate the rollers; and continuously driven rollers wear the belt. Such systems are hard on the filter belt and require much operator attention. Additionally, such prior designs have not provided any reliable ways or means to functionally separate adjacent steps such as form, drain, wash, etc.

SUMMARY OF THE INVENTION

The primary object of the invention is the provision of a horizontal belt filter in which an endless belt filter medium moves by indexing over a stationary filtration section that is comprised of one or more liquid collecting pans that are connected to a source of relatively lower pressure for filtration. The relatively lower pressure may be a vacuum or in the case of an enclosed pressure filter, a reduced pressure zone such as atmosphere. In this application the term vacuum pan includes any relatively lower pressure.

Another object is the provision of a filter of the type described in which all rollers are non-driven idler rollers, the filter belt is advanced through the filter solely by shifting of rollers to effect indexing thereby eliminating the problems attendant upon driven rollers.

Another key object is the provision of a belt indexing system that includes two shiftable rollers mounted in fixed spaced relationship to each other for simultaneous coordinated movement by the same mechanism.

A further object is the provision of means to suspend the filter belt on an air cushion for indexing thereby substantially eliminating destructive tension and rubbing on the belt.

A still further object is the provision of means temporarily defining on the filter belt successive adjacent, but functionally separate zones corresponding to the filtration steps being carried out.

Another very important object is the provision of a filter attaining the foregoing objects while conducting filtration on a substantially continuous basis.

BRIEF DESCRIPTION OF INVENTION

In accordance with the invention, the filter comprises a stationary, usually horizontal, filter section provided with suitable drainage decks and connected to a vacuum or other relatively lower pressure as required for filtration. An endless belt filter medium is trained to pass across the filter; and a series of parallel idler rollers are provided to carry the belt from the filter section successively through a cake discharge section, a belt wash section and return to the filter section for passage therethrough.

Integral with the roller system is a unique belt indexing system in which, during periods when no vacuum is applied, the belt is indexed (advanced) a finite distance, vacuum is applied and, while filtration proceeds, the belt advance mechanism is reset for the next cycle concomitantly with discharge of filter cake.

The filter includes the usual filtration functions such as form, dewater, rinse and/or dry through which the belt is indexed. To separate the filtration functions, a plurality of adjacent vacuum pans are provided and inflatable transverse dams are positioned above the belt over the walls of adjacent pans. When the belt is stationary, the dams are inflated whereupon they contact the belt surface and, in combination with the underlying vacuum pans, functionally divide the belt surface according to the steps involved.

The cycles are timed. Typically, a filtration period between indexing is 30 seconds during which time vacuum is applied to the belt on the vacuum pans. Feed is supplied to the form section while dewatering, washing, or drying proceeds in the other sections.

At the end of each cycle, vacuum is released, a slight positive air pressure is applied from the pans beneath the belt thus floating it. While floated, the belt is rapidly indexed to advance it a predetermined distance. Vacuum is then reapplied and the cycle is repeated. Indexing of the belt while it floats on an air cushion is important. It virtually eliminates belt wear and makes indexing effortless.

In accordance with this invention, the belt indexing mechanism is the sole means by which the filter belt is advanced through the filter. All rollers about which the belt is trained are journaled for idling only. The indexing mechanism comprises two idler rollers spaced apart in fixed relationship on a common carriage or frame that is mounted for shifting. The two rollers, herein called first and second indexing rollers, are also positioned in a particular but variable relationship with other rollers in the system. The shiftable carriage is positioned so that the first indexing roller is adjacent the point of belt exit from the filtration section and the second indexing roller is positioned downstream thereof in the path of the belt return run. At least one idler fixed-position roller is located in the belt return path between the first and second indexing rollers. A first brake or clamp is provided to lock the belt downstream from the filter section against any reverse linear motion as the belt is indexed. While the first brake is on, the carriage and both indexing rollers are shifted. As a result, the first indexing roller moves a finite distance away from the discharge end of the filter section; and a section of belt is indexed (advanced) across the vacuum pans an equivalent distance. Depending on the system configuration, this distance may be less than, equal to, or greater than the distance the indexing roller moves away from the vacuum pan.

Because both indexing rollers are in fixed relationship on the carriage, when the first indexing roller moves, the second indexing roller also moves the same distance in the same direction. Another fixed-position roller is spaced downstream from the second indexing roller so that, on belt advance, the second indexing roller moves toward the fixed roller. This movement shortens the belt between these rollers a distance equivalent to the belt advance across the vacuum pans. This forward indexing is done rapidly. After indexing, vacuum is reapplied through the pans thereby locking the belt against travel. At the same time the first brake downstream from the first indexing roller is released. Thereafter, with vacuum still applied, the common frame with both shiftable rollers is pulled or retracted slowly in the opposite direction so that the first indexing roller moves back toward the filter section while the second moves in the same direction which takes it away from its associated fixed-position roller. When retraction occurs, the length of belt on the upper reach while includes the filter section is shortened as the first indexing roller retracts toward the vacuum pans; and at the same time, reverse movement of the second indexing roller away from the adjacent fixed-position roller increases the belt length between those rollers on equivalent amount. Upon completion of retraction, a section of belt is, in effect, stored upstream from the filter section for use in indexing.

By incorporating both indexing rollers in a single shiftable carriage, only a single actuator, such as a ram, operable only on the carriage is required to effect belt indexing. The single carriage is important because it fixes permanently the spaced relationship between the two indexing rollers and eliminates the need for separately controlled indexing rollers. Thus, any change in the length of one run of the belt is automatically and precisely compensated for by an offsetting change in the other run of the belt.

Included in the system is a tension roller which maintains a uniform tension on the belt by taking or giving up nominal slack as required during operation. An alignment roller assembly is also provided. In the preferred embodiment, both of these rollers are located downstream in the direction of belt travel from the second indexing roller, but are upstream from the filter section. This is desired because the alignment roller works best on the belt during rapid movement on forward indexing.

It is important that the filter belt is never subjected to frictional engagement with driving rollers. Instead, the belt moves only with idlers. In this way belt wear due to slippage between rollers and belt has been substantially eliminated.

In order that the invention may be more readily understood and carried into effect, reference is made to the accompanying drawings and description thereof which are offered by way of example only and not in limitation of the invention, the scope of which is defined solely by the appended claims including equivalents embraced therein.

BRIEF DESCRIPTION OF DRAWINGS

In the drawings:

FIG. 5 is a simplified side view showing the filter when the belt is ready for indexing. For clarity, many components have been omitted.

FIG. 6 is a view like FIG. 5 but illustrates the filter just after the belt has been indexed.

DETAILED DESCRIPTION OF INVENTION

Figure 1:
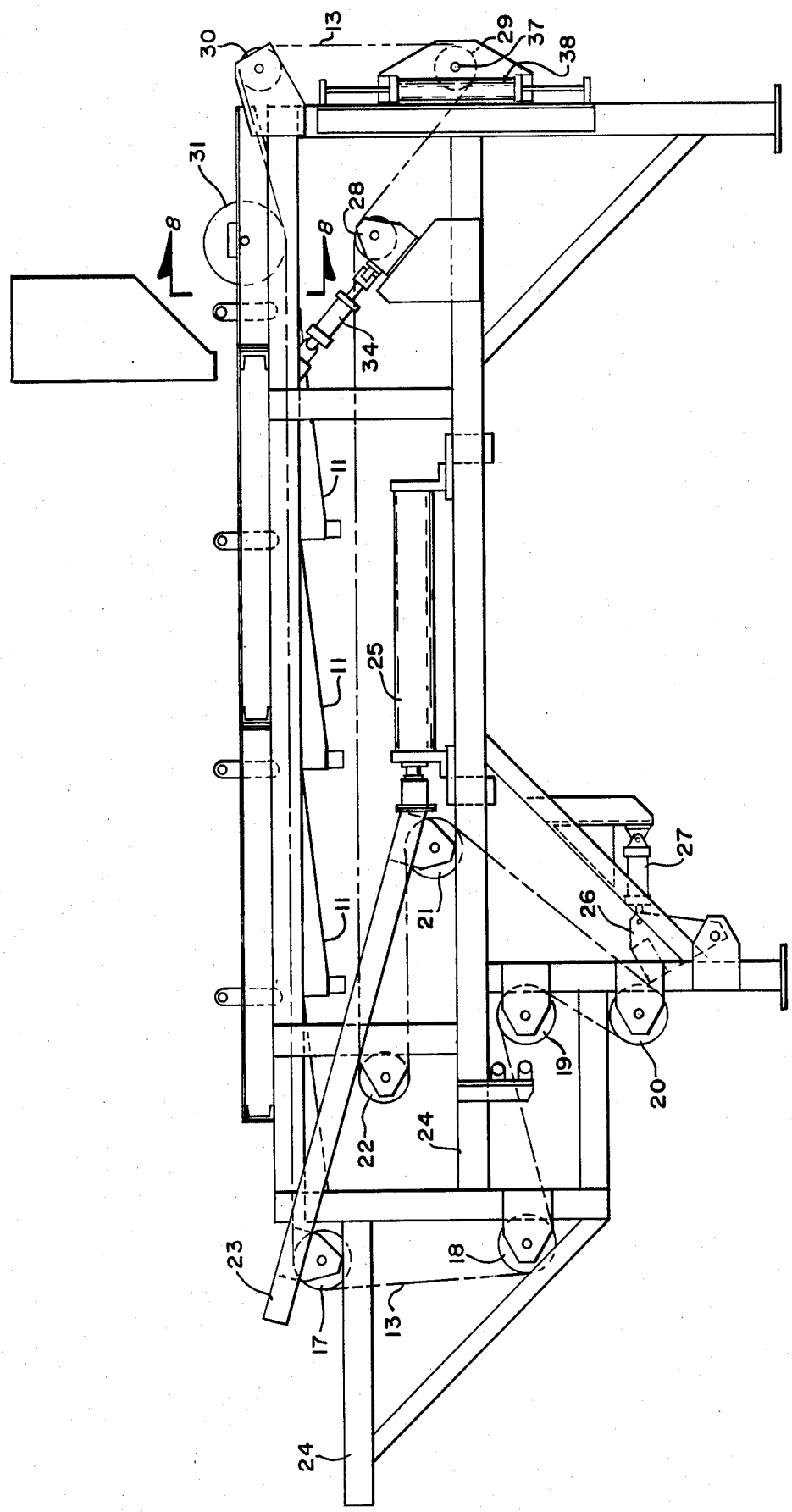
FIG. 1 is a side elevation of a horizontal belt filter embodying the invention.
Figure 2:
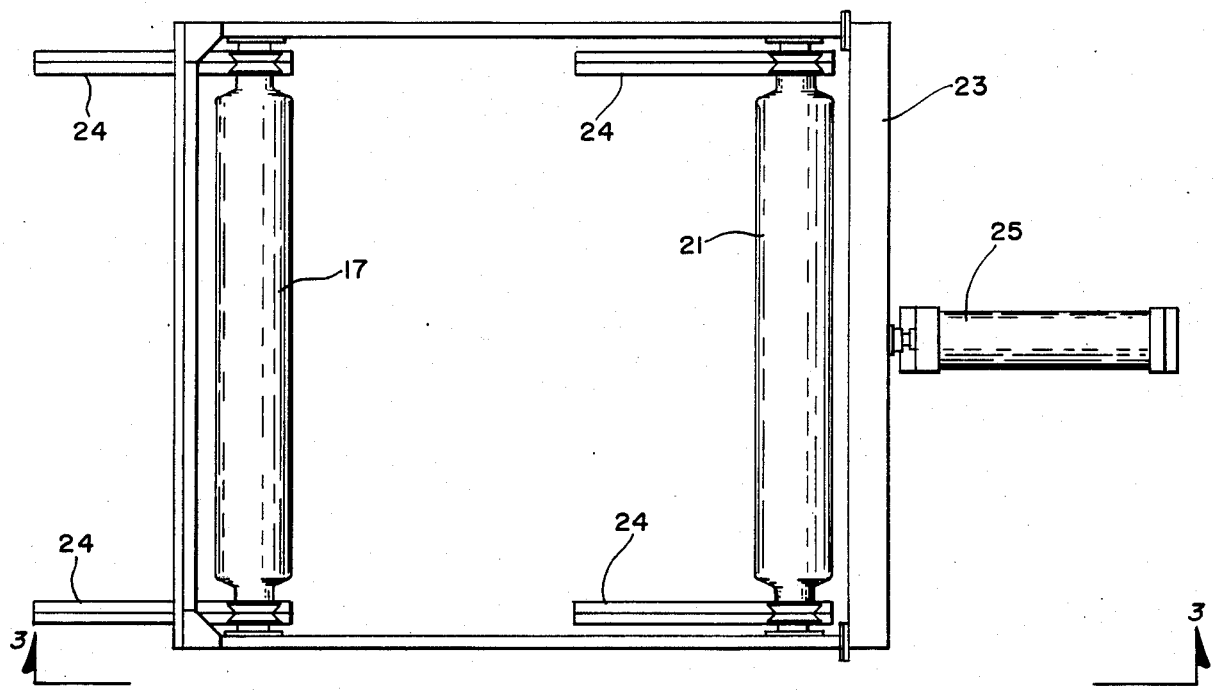
FIG. 2 is a top elevation of the indexing rollers and frame embodied in the filter shown in FIG. 1.
Figure 3:
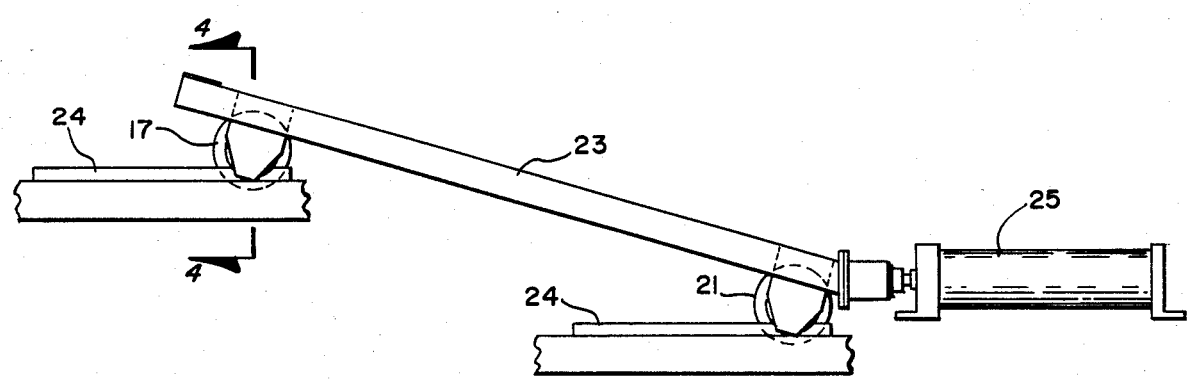
FIG. 3 is a side view taken as looking in the direction of arrows 3 in FIG. 2.

The filter comprises a main frame on which are mounted one or more vacuum pans 11. The pans have perforated, grid-like tops 12 adapted to support a suitable endless belt filter medium 13 while permitting the passage of air and liquid. A suitable feed distributor is located above the belt over the first of the vacuum pans. Each vacuum pan is equipped with a bottom valved outlet conduit 14 for withdrawal of air and filtrate. A branch conduit 15 is provided for admitting pressured air. The filtrate outlet conduit 14 will connect through a conventional receiver to an usual vacuum source while the pressured air inlet 15 will connect through a suitable timed valving system to a source of pressured air.

The filter belt is trained about a plurality of idler rollers each of which is at least as wide as the belt itself. These rollers include suitably mounted rollers to maintain uniform nominal tension on the belt and to keep it in proper alignment.

In accordance with this invention, a pair of idler rollers, referred to as first and second indexing rollers, 17 and 21, are mounted on a rigid but shiftable common frame or carriage 23. This arrangement is the basis for a unique belt indexing system which is the sole driving force for advancing the filter belt through the filter. Since all the rollers are idlers only and none are driven there is essentially no slippage to wear the belt surface. Additionally, since both indexing rollers move together there is no need to coordinate separate roller positions.

Figure 4:
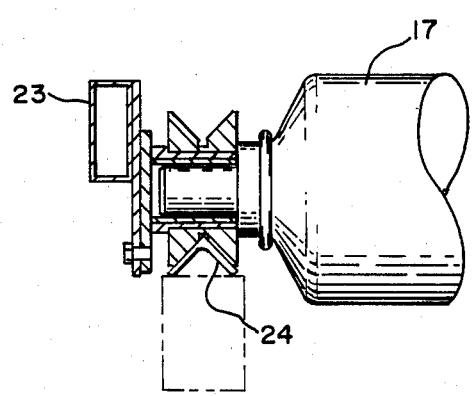
FIG. 4 is a partial sectional view taken in the plane of 4—4 of FIG. 3 looking in the direction of the arrows

Referring especially to FIG. 1 and reading counterclockwise in the direction of belt travel from the upper left end of the filter, the rollers are numbered 17 through 22 inclusive, and 28–30. A supplemental roller 31 is provided above the belt to guide its return to the vacuum pans. Rollers 17 and 21 are respectively the first and second indexing rollers. Both are idlers and are mounted on the carriage 23 which rests on and is guided by horizontal rails 24 (See FIG. 4). The carriage is connected to a ram 25 by which the assembly of carriage and rollers is moved to the left to index the belt forward toward the discharge position at the same time pulling a clean belt section onto the vacuum pans. Thereafter, the carriage and rollers are retracted slowly to reset the system and at the same time discharge cake and effect belt wash.

Rollers 18-19 guide the belt between wash sprays immediately following cake discharge. Thereafter, the belt passes around another idler 20 thence over the second shiftable idler 21 and a fixed-position roller 22. The ram indexes the frame and rollers rapidly in one direction to advance the belt then retracts the assembly (carriage and indexing rollers) slowly. Roller 22 is positioned downstream (in the direction of belt travel) from the second indexing roller a distance slightly greater than the travel of the carriage when the ram extends.

During rapid forward indexing of the belt it is necessary to clamp the belt against reverse movement upstream over the first indexing roller 17. This is accomplished by a pivotal clamp 26 and a ram 27 adjacent the roller 20. The ram 27 forces the pivoted member against the roller 20 to lock the belt against movement.

Figure 11:
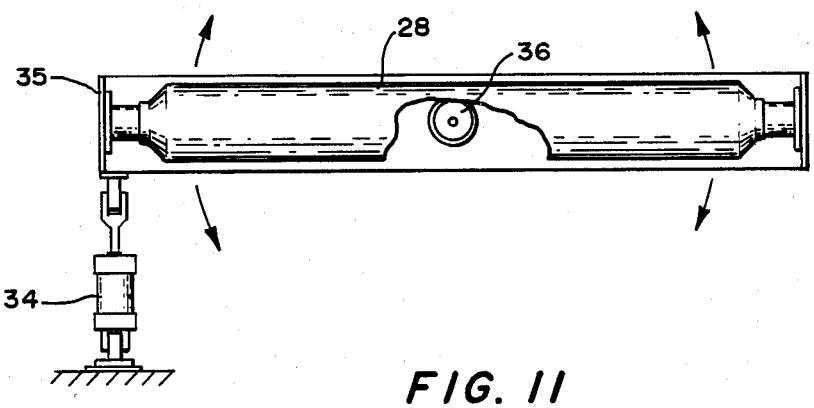
FIG. 11 is a partial top view of the alignment roller assembly.
Figure 12:
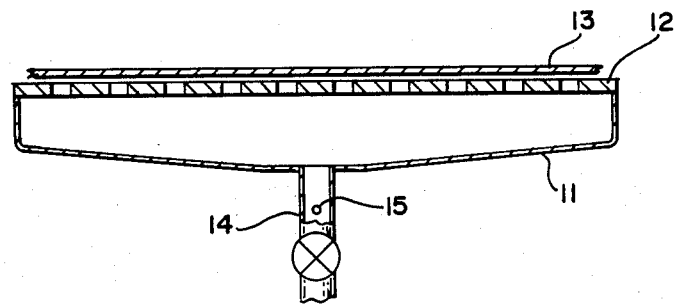
FIG. 12 is a sectional view of one of the vacuum pans and filter belt.

Roller 28 is for belt alignment while roller 29 is a tension roller; and roller 30 is a return roller. As best illustrated in FIG. 11, the alignment roller is adjustable at both ends by means of a ram 34 which pivots the roller bracket 35 about a center pivot 36 to cant the roller 28 with respect to the belt movement path to maintain or correct alignment in accordance with known practice.

Nominal tension on the belt is maintained by a roller 29 which is journaled in suitable bearings 37 in slidable blocks connected to ram 38 in turn maintained under desired constant The final fixed-position roller 30 adjacent the feed end of the filter guides the belt back over the vacuum pans. This roller 30 along with the final media guide roller 31 initially spaces the belt a little above the top of the vacuum pans. A plate could be used in place of the roller 30, if desired. Also, belt indexing may be further facilitated by positioning the indexing roller 17 to normally hold the belt above the grids at the point of exit.

Figure 8:
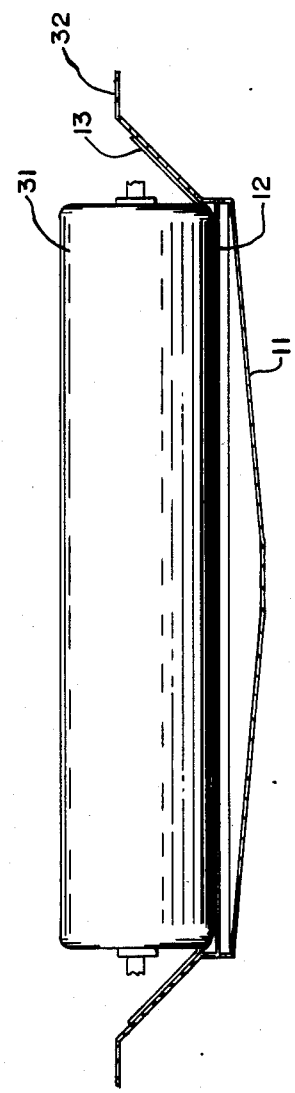
FIG. 8 is a partial section taken in the plane of line 8—8 of FIG. 1 looking in the direction of the arrows

As shown in FIG. 8, the vacuum pans have upwardly sloping side wings 32 above the pan proper. The belt rests on the drainage surface 12 of the pans 11 and extends up onto the wings. This insures that all feed is retained on the belt.

The final media guide roller 31 is of length about equal to the width of the vacuum pans. As the belt passes under the roller, it is properly positioned just above (almost touching) the grid so that when vacuum is applied, the belt is pulled onto the drainage grids but when there is no vacuum the belt is loose relative to the grid.

Operation of the system is best shown in FIGS. 13 and 5-7.

Figure 7:
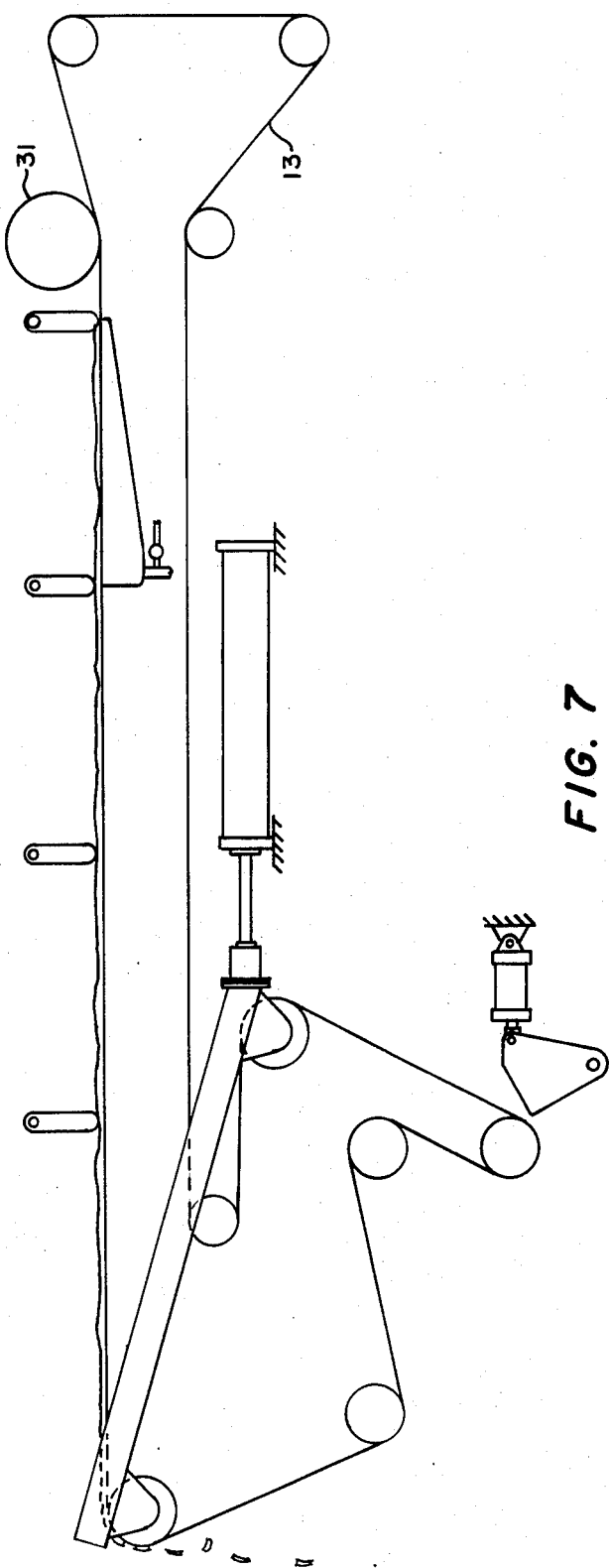
FIG. 7 is a view similar to FIGS. 5 and 6 but with the indexing mechanism partially retracted.
Figure 13:
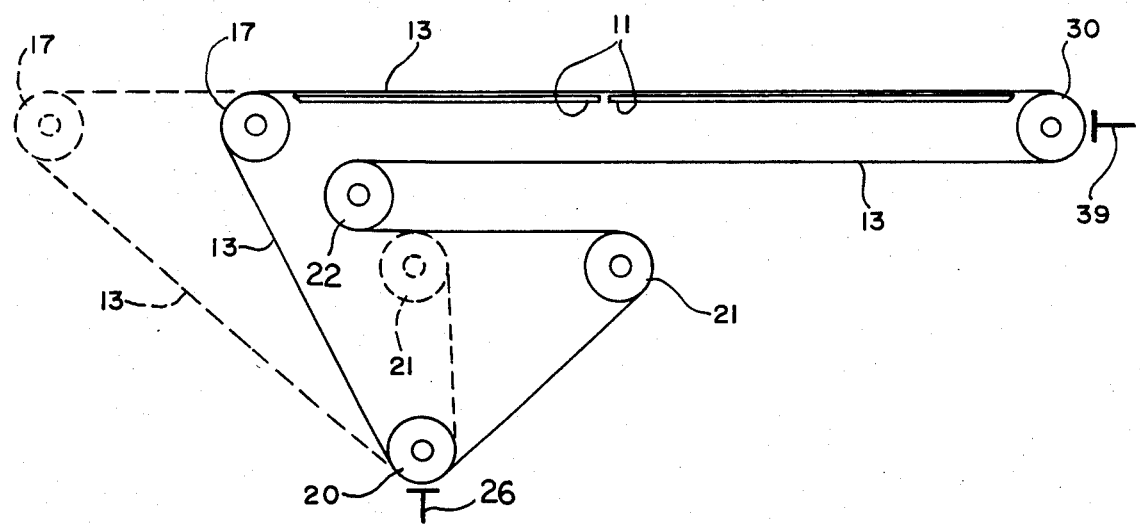
FIG. 13 is a diagram illustrating the basic functions of the indexing system.

The simplest form of the system is illustrated in FIG. 13 in which the same components are given the same reference numerals as in FIGS. 5-7. Essentially, the system comprises an endless belt that travels through a working run that includes a filter section, and a return run that conducts the belt leaving the filter section through necessary cake discharge, belt wash, alignment, etc. thence back to the filter section.

The filter section includes vacuum pans 11 over which the belt 13 passes. The belt return run includes the belt and both the first and second indexing rollers 17 and 21 which are on the carriage 23. The belt leaving the first indexing roller 17 passes around a fixed-position roller 20 that is located downstream from the first roller 17 and between it and the second indexing roller 21. The roller 20 is below the vacuum pans and below both indexing rollers. From the roller 20 the belt moves over the second indexing roller 21 thence in a direction generally back toward the first indexing roller then around a fixed-position roller 22 and back toward the feed end of the filter section at roller 30.

In the position as shown in solid lines in FIG. 13, the unit is ready for indexing. To index, the vacuum is turned off and the first brake 26 is applied to lock the belt against movement. Ram 25 (FIG. 6) is rapidly extended full length to move the carriage 23 and rollers 17 and 21 to the positions shown in dotted lines. This pulls the belt over the vacuum pans a distance equivalent to the ram extension. In the embodiment illustrated, the belt indexes a distance greater than the ram extension. The belt length needed to permit indexing is made available by the movement of the second indexing roller 21 toward the idler roller 22. The net result of this movement is to transfer belt lengths between working and return runs as needed to satisfy the indexing movement.

Once the indexing has been completed the first brake 26 is released and the second brake (which may be vacuum) is applied. Then the system is actuated to slowly retract the ram so that both rollers 17 and 21 more gradually. The first roller 17 moves toward the discharge end of the filter section while the other moves away from its associated roller 22 and toward the feed end of the filter. The net effect is to shorten the portion of the working run of the belt above the pans a given amount while simultaneously lengthening the portion of the working run below the pans the same amount. That is, the belt between rollers 17 and 30 becomes shorter while the length between rollers 21 and 22 increases.

In the usual operation, the second brake comprises the vacuum that holds the belt onto the drainage grids. However, if the unit is operated as a gravity filter without vacuum, then some other brake must be provided. In FIG. 13 this second brake has been designated 39. It can be located any place on the belt working run downstream of the second indexing roller 21 and upstream of the first indexing roller 17.

Because of the configuration of the belt system, the belt movements are quite complex and care must be taken to position the rollers correctly. For instance, upon indexing, some belt will actually move around the roller 17. In most cases this is required to satisfy the increased distance between the first indexing roller and the first fixed-position roller 20, such increase being the result of the indexing. Final positioning of the rollers will depend on the final configuration of the system but may be easily determined.

The belt is maintained under a nominal constant tension by the tension roller 29. This roller along with slidable bearings 37 and ram 38 can react to accommodate minor belt stretching or shrinking. The roller does not function as part of the belt indexing system.

A first brake is provided on the return run to selectively clamp the belt at a location between the first and second indexing rollers during rapid indexing of the carriage and belt; and a second brake is provided to clamp the belt in its return run during the active filtration cycle while the carriage is slowly retracted.

During the carriage retraction, a section of belt is slowly shifted downstream from the first indexing roller by virtue of the second indexing roller 21 moving away from the next roller 22 lengthening the return run. As the belt passes around the first roller 17 the cake carried thereon is discharged.

Figure 9:
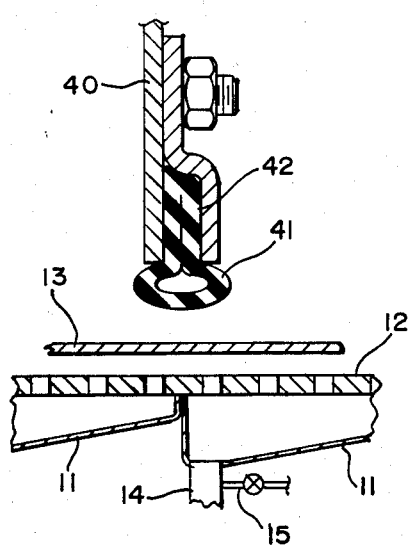
FIG. 9 is a partial side sectional view showing one of the inflatable dams of the invention overlying the filter belt with the dam deflated and thus retracted.
Figure 10:
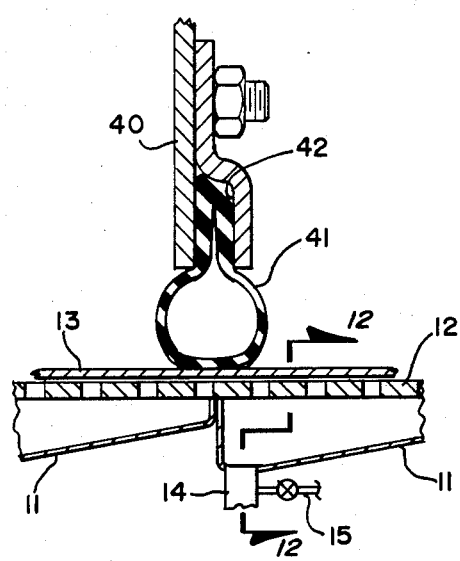
FIG. 10 is a view similar to FIG. 9, but with the dam inflated.

In order to provide functional separation of adjacent filtration steps a unique dam system is provided. This is illustrated in FIGS. 9 and 10. The dam 40 comprises an inflatable tube 41 carried in an inverted channel 42. As illustrated, the dam spans the belt transversely above the sidewalls of vacuum pans. As illustrated in FIG. 9, when the tube 41 is deflated for indexing, it is out of contact with the belt and cake. As shown in FIG. 10 the tube is inflated into contact with the belt and cake during filtration thus functionally separating the cake from adjacent filtration functions. In some cases it may be desired to separate the cake into a plurality of zones above a single pan. This may be done with transverse dams not necessarily directly above the pan walls.

From the foregoing it is apparent that this invention is based on certain equipment requirements. The single carriage and the two indexing rollers mounted thereon are critical. This combination insures that each indexing is a duplicate of all other indexings and there is absolutely no need to separately shift and/or coordinate the two shiftable indexing rollers either on indexing or on resetting.

Since there are no driven rollers acting on the belt, belt wear by friction is substantially eliminated. The brake clamp does no damage because all it does is pinch the belt against the roller 20 during the brief indexing period, typically 5–7 seconds.

The system will utilize suitable controls, conveniently including a micro-processor to time and coordinate the various functions in accordance with the invention. Such controls are not described in detail because their function is well known.

Although the invention has been described in connection with vacuum filters, it has application to an enclosed filter operated as a pressure filter. Pans operated under vacuum are the equivalent of a pressure environment operated at a pressure differential. For gravity drainage the pressure differential can be imposed by the feed slurry. The filter section is in an "on" condition when a pressure differential is imposed.

I claim:

1. A belt filter comprising an elongated filter section which includes means for the selective application and discontinuation of vacuum thereto and which has an inlet end and a discharge end; an endless belt filter medium trained to pass over said filter section thence from said discharge end through a return run back to said inlet end; a plurality of parallel idler rollers in the path of said return run over which said belt is trained; all of said rollers being mounted solely for idling; said rollers including serially a first indexing roller, a first fixed position roller, a second indexing roller and a second fixed position roller; a rigid elongated carriage angled to extend from adjacent said discharge end to terminate below said filter section between said discharge end and inlet end; said carriage being mounted for substantially horizontal reciprocal movement; bearing means mounting said indexing rollers for rotation one at each of the opposite ends of said carriage; means for effecting reciprocation of said carriage to effect simultaneous reciprocation of both of said indexing rollers; a belt brake comprising means to grip said endless belt at a location between said first and second indexing rollers to block movement of said belt at said location; valved conduit means to apply vacuum to said filter section for filtration and to discontinue vacuum for belt movement; and means operable while vacuum to said filter section is discontinued to cause said brake to grip said belt; and means to reciprocate said carriage to move said first indexing roller to and from said discharge end.

2. A filter according to claim 1 in which said filter section comprises a plurality of adjacent substantially horizontal drainage pans for collecting filtrate; a source of pressured air; valved conduit means providing communication between said source of pressured air and said pans; and means to supply pressured air to said pans while vacuum to said filter section is discontinued and said carriage is reciprocating in a direction to move said first indexing roller away from said discharge end.

3. A filter according to claim 2 in which each of said drainage pans has an open grid top for supporting said belt and sidewalls that extend from alongside said grid top upwardly and outwardly therefrom; and there is provided an upper belt guide roller spaced above said grid top adjacent said inlet end of said filter section and of length to span said grid between said sidewalls.

4. A filter according to claim 3 in which said first indexing roller is in substantially the same horizontal plane as said filter section, said first fixed position roller is below said filter section, said second indexing roller is above said first fixed position roller and spaced laterally therefrom, and said second fixed position roller is spaced laterally from said second indexing roller, whereby when said carriage is reciprocated to move said first indexing roller toward said discharge end said second indexing roller moves away from said second fixed position roller.

* * * * *